Sept. 6, 1949.  M. F. REYNST  2,481,345
DEVICE FOR MAGNETICALLY DETERMINING
THICKNESS OF COATINGS
Filed May 9, 1946
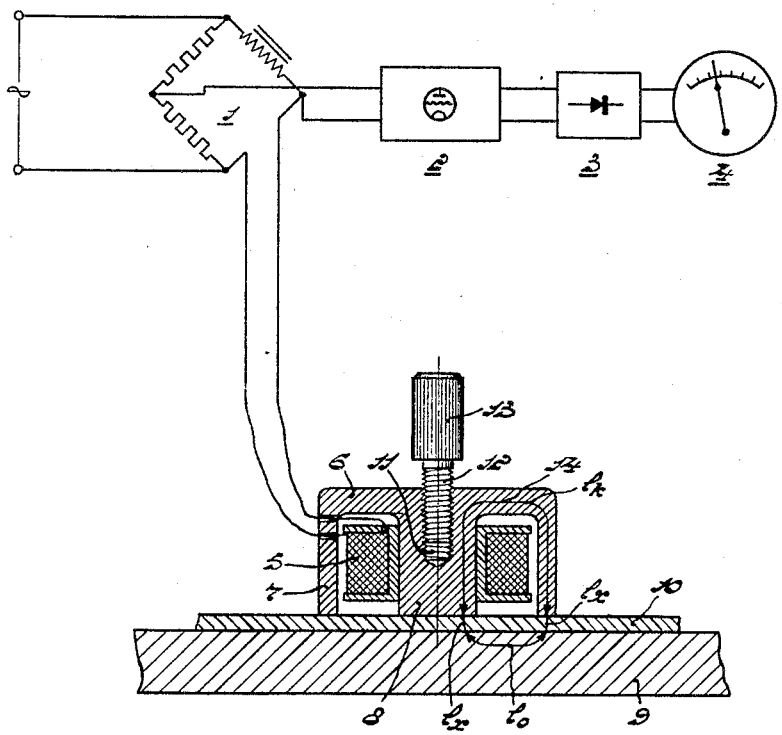
INVENTOR.
MAXIMILIEN FELIX REYNST
BY
*E. F. Wenderoth*
ATTORNEY

Patented Sept. 6, 1949

2,481,345

UNITED STATES PATENT OFFICE 2,481,345

DEVICE FOR MAGNETICALLY DETERMINING THICKNESS OF COATINGS

Maximilien Felix Reynst, Eindhoven, Netherlands, assignor, by mesne assignments, to Hartford National Bank and Trust Company, Hartford, Conn., as trustee Application May 9, 1946, Serial No. 668,626
In the Netherlands June 7, 1941

Section 1, Public Law 690, August 8, 1946
Patent expires June 7, 1961

2 Claims. (Cl. 175—183)

The invention relates to a device for magnetically determining the thickness of a layer consisting of nonmagnetic or poorly magnetic material.

For magnetically determining the thickness of a layer of about from 1 to 5000 microns which is provided on a ferro-magnetic material and which may consist, for example, of lacquer, paper, rubber, metal oxides, a nonmagnetic metal such, for example, as aluminium or again of a metal of slight permeability, for example of nickel, devices are known wherein use is made of a coil provided on an iron core which has the approximate shape of a horse-shoe. In determining the thickness of a layer of the said material the said iron core is first placed in this case, in order to obtain a calibration value, upon an uncovered portion of the ferro-magnetic substratum or upon a substratum provided with a layer of known thickness and then upon the layer whose thickness has to be determined, in which latter event the magnetic lines of force pass through the layer of unknown thickness and through the ferro-magnetic substratum. The unknown thickness of the layer whose thickness is to be determined can then be deduced from the difference of the measurements performed in both cases on the iron-core coil.

The said measurement, which may also be performed on layers not applied to a ferro-magnetic substratum, for example a paper ribbon and the like, by placing them upon a ferro-magnetic substratum, may consist, for example, in the measurement of the said voltage prevailing across the coil if the latter is excited in both cases, that is to say in calibrating and in measuring, by an alternating current of the same value.

It is also possible to determine the thickness of the layer by connecting the coil into a bridge-connection supplied by alternating current. In the calibration measurement the equilibrium of the bridge-connection is adjusted whilst the measurement is effected with the aid of an indicating instrument arranged in a diagonal of the bridge-connection.

In a further known device of the above-described type the layer thickness is determined with the aid of the voltage induced in a secondary winding provided on the iron core.

Finally it is also known to utilize an iron core secured to a tension spring and gradually to reduce the exciting current flowing through the coil until the core is drawn away by the spring from the magnetic substratum or from the layer present thereon, in which event the exciting current prevailing at this instant affords an indication about the thickness sought for.

In order to obtain a calibration value with the above-mentioned known devices, either the voltage across the coil provided on the iron core or the exciting current is adjusted with the aid of an indicating instrument to a determined value or again, if the coil forms part of a bridge-connection, the balance thereof is adjusted, for example, by altering a resistance located in the one of the branches of the bridge-connection.

It is true that with the devices of the above-described type, which comprises a pointer instrument, for example, a moving coil meter, the deflection of the pointer is proportional to the layer thickness to be determined but the deflection per unit of layer thickness, for example per micron, greatly depends on the magnetic permeability of the ferro-magnetic substratum, which permeability is markedly different for different sorts of iron or steel and, in addition, depends for every sort of iron and steel on the mechanical and thermal treatment thereof.

Besides, the deflection of the pointer which is obtained per unit of layer thickness also depends on the thickness of the ferro-magnetic substratum.

It is true that owing to this dependence of the obtained indication on the magnetic properties of the substratum the known devices are suited for taking comparative measurements but it is in practice impossible to perform absolute measurements with these known devices.

According to the invention, with devices of the above-described type the said drawbacks are avoided by the use of a U-shaped iron core whose reluctance is adjustable.

The expression "U-shaped iron cores" should be understood here and hereinafter to include cores of such shape that the path taken by the magnetic lines of force in the iron core of the coil substantially has the shape of a U.

The adjustment of the reluctance may be brought about by different known means. If a wide range of adjustment is required, the adjustment is preferably effected by adjusting the length of an air-gap which extends over the whole of the cross-sectional area of the core but, if only a small range of adjustment is required, in order to be able exactly to adjust the reluctance of the core, use is made of an air-gap of adjustable size whose area is smaller than the cross-sectional area of the core.

According to one favourable embodiment of the device according to the invention, the core consists of two concentric portions which are connected to one another at one end, owing to which any influence that might be exerted on the measurement by the dependence of the reluctance of the substratum on the direction in which the magnetic lines of force issuing from the core traverse the substratum is avoided whilst the inner core portion exhibits an air-gap of adjustable size.

By carrying the present invention into effect it is achieved that the indication obtained about the layer thickness to be ascertained exclusively depends thereon and is independent of the magnetic properties of the substratum utilized. In connection therewith the device according to the invention may be provided, in contradistinction to known devices, with an indicating instrument comprising a scale calibrated in layer thicknesses.

The invention will be explained more fully with reference to the accompanying drawing which diagrammatically represents a particularly favourable form of construction of a device according to the invention.

In the shown device for magnetically determining the thickness of a layer present on a ferro-magnetic substratum 1 denotes a bridge-connection which is supplied by alternating current and whose output voltage is supplied, after amplification 2 and rectification 3, to a pointer instrument 4. One of the branches of the bridge comprises a coil 5 which is provided on an iron core consisting of two concentric cylindrical parts 7 and 8 which are connected to one another at one end by means of a plate 6. The free ends of the core or the middle core alone are placed on the surface of a layer of lacquer 10 which is present on an iron band 9 and whose thickness has to be determined. The inner core portion 8 exhibits a threaded cavity 11 having placed in it a likewise threaded adjusting core 12 provided with an operating knob 13 with the aid of which the reluctance of the iron core can be adjusted.

The figure represents furthermore at 14 the path taken by the magnetic lines of force and it appears therefrom that the path taken by the said lines in the iron cores 7, 6, 8 has the shape of a U.

For the purpose of calibrating the device, the free ends of the iron core are placed directly upon the surface of the substratum 9 and the adjusting core is turned until the pointer of the instrument 4 indicates zero, the balance of the bridge-connection being now adjusted.

By placing the iron core upon the surface of the layer 10 the balance of the bridge-connection is disturbed due to the change of the reluctance of the circuit of the lines of force and the thickness of the layer 10 may be read off directly on the instrument 4 since the indication obtained is substantially independent of the magnetic properties of the substratum 9, as may appear from the following.

The voltage across the coil 5, which is decisive for the balance of the bridge-connection, is proportional to the flux $\phi$ in the core. If the permeability of the layer 10 is equal to that of air we find for the value of the flux $\phi$:

$$\phi = \frac{M.M.F.}{\frac{2l_x}{Q_x} + \frac{l_k}{\mu_k Q_k} + \frac{l_0}{\mu_0 Q_0}}$$

wherein:

M. M. F. = the magnetomotive force operative in the magnetic circuit,
$l_x$ = the thickness to be determined of the layer 10,
$l_k$ = the length of the path of the flux in the core 7, 6, 8,
$l_0$ = the length of the path of the flux in the substratum 10,
$\mu_k$ = the magnetic permeability of the core iron,
$\mu_0$ = the magnetic permeability of the substratum 9,
$Q_x$ = the average cross-sectional area of the path of the flux in the layer 10,
$Q_k$ = the average cross-sectional area of the path of the flux in the iron core 7, 6, 8,
$Q_0$ = the average cross-sectional area of the path of the flux in the substratum 9.

It is to be noted that the factors $Q_x$, $l_k$, $l_0$ and $\mu$ have unvariable values which are determined by the dimensions of the iron core or by the core iron.

In calibrating the device the free ends of the core are placed directly upon the surface of the substratum 9 and consequently $l_x$ is equal to zero and the first term in the denominator of the above formula is also equal to zero. By adjusting the balance of the bridge-connection with the aid of the adjusting core 12 it is shown that, since in the case of balance of the bridge-connection the flux and the M. M. F. have predetermined values, the sum of the two last terms in the denominator of the formula acquires a determined value which is independent of the magnetic properties of the substratum 9 used. In this way the influence of the magnetic properties and the dimensions of the substratum 10 is compensated by adjusting the reluctance of the iron core.

In determining the thickness of a layer the disturbance of the balance of the bridge and consequently the indication on the instrument 4 almost exclusively depends on the airgap caused by the layer 10 ($2l_x$) and the instrument may be calibrated in layer thicknesses, for example in microns.

It may be observed that the device according to the invention may also be advantageously utilized for determining the divergence of the thickness of a layer from a prescribed value if the calibration is effected with the aid of a layer of the required thickness.

Finally it may be pointed out that the device according to the invention may also be utilized for determining the thickness of a layer which consists of a material having a poor magnetic permeability such, for example, as nickel.

In determining the thickness the permeability of the layer should, of course, be taken into account but also in this case the device according to the invention offers the advantage that the indication obtained is independent of the properties of the substratum.

What I claim is:

1. Apparatus for magnetically determining the thickness of a layer of magnetic material, comprising a closed flux path including a core of magnetic material consisting of two concentric portions which are connected to one another at one end and including a longitudinal opening in the said inner core at the said end, a layer of the said material to be measured and a removable armature, a coil element surrounding the said inner portion and means formed of magnetic material and rotatably and longitudinally movable in the said opening to vary the amount of the total magnetic material in the said flux path positioned within the limits of the said element, the said means being independent of the thickness of the said material.

2. Apparatus for magnetically determining the thickness of a layer of material, comprising a core of magnetic material having a U-shaped flux path consisting of two concentric portions which are connected to one another at one end and including a threaded cavity at the said end of the said inner portion, a coil element surrounding said inner portion of said core and threaded means formed of magnetic material and longitudinally movable in the said threaded cavity to vary the amount of magnetic material in the said inner portion of the said U-shaped flux path positioned within the limits of the said element.

MAXIMILIEN FÉLIX REYNST.

REFERENCES CITED

The following references are of record in the file of this patent:

UNITED STATES PATENTS

| Number | Name | Date |
|---|---|---|
| 349,611 | Stanley | Sept. 21, 1886 |
| 1,718,494 | Schuring | June 25, 1929 |
| 1,920,818 | Verrall | Aug. 1, 1933 |
| 1,969,536 | Winne | Aug. 7, 1934 |
| 2,033,654 | Selquist et al. | Mar. 10, 1936 |
| 2,266,620 | Coffman | Dec. 16, 1941 |

FOREIGN PATENTS

| Number | Country | Date |
|---|---|---|
| 368,006 | Great Britain | Mar. 3, 1932 |